United States Patent
Karuppana et al.

(10) Patent No.: US 6,744,149 B1
(45) Date of Patent: Jun. 1, 2004

(54) SYSTEM AND METHOD FOR PROVIDING STEP-DOWN POWER CONVERSION USING AN INTELLIGENT SWITCH

(75) Inventors: Samy V. Karuppana, Kent, WA (US); Aly Amirali Jetha, Seattle, WA (US); Jes Thomsen, Copenhagen (DK)

(73) Assignee: Midtronics, Inc., Willowbrook, IL (US)

( * ) Notice: Subject to any disclaimer, the term of this patent is extended or adjusted under 35 U.S.C. 154(b) by 0 days.

(21) Appl. No.: 09/654,217

(22) Filed: Sep. 1, 2000

Related U.S. Application Data (60) Provisional application No. 60/153,372, filed on Sep. 10, 1999.

(51) Int. Cl.$^7$ ................................................ H02J 1/00
(52) U.S. Cl. ........................................ 307/31; 307/10.1
(58) Field of Search ................................ 323/282, 283, 323/284, 286, 222; 363/131, 16; 307/30, 31, 36–38, 10.1, 10.7, 10.8; 361/63

(56) References Cited

U.S. PATENT DOCUMENTS

| | | | | |
|---|---|---|---|---|
| 4,371,824 A | * | 2/1983 | Gritter | 318/722 |
| 4,591,914 A | * | 5/1986 | Hakamada et al. | 358/190 |
| 4,618,812 A | * | 10/1986 | Kawakami | 323/224 |
| 5,569,966 A | * | 10/1996 | Schantz, Jr. et al. | 363/56 |
| 5,719,484 A | * | 2/1998 | Taniguchi et al. | 322/20 |
| 5,798,577 A | | 8/1998 | Lesesky et al. | 307/10.7 |
| 5,818,673 A | * | 10/1998 | Matsumaru et al. | 361/63 |
| 5,825,248 A | * | 10/1998 | Ozawa | 330/267 |
| 5,864,116 A | | 1/1999 | Baker | 219/130.33 |
| 5,871,858 A | | 2/1999 | Thomsen et al. | 429/7 |
| 5,907,233 A | | 5/1999 | Jabaji | |
| 5,973,488 A | | 10/1999 | Fackler | |
| 5,977,758 A | | 11/1999 | Noguchi et al. | |
| 5,986,442 A | | 11/1999 | Abe et al. | |
| 6,031,361 A | | 2/2000 | Burnstein et al. | |
| 6,054,846 A | | 4/2000 | Castleman | |
| 6,057,607 A | * | 5/2000 | Rader, III et al. | 363/131 |
| 6,087,816 A | * | 7/2000 | Volk | 323/282 |
| 6,119,238 A | * | 9/2000 | Jennings et al. | 713/300 |
| 6,295,217 B1 | * | 9/2001 | Yang et al. | 363/49 |

* cited by examiner

*Primary Examiner*—Rajnikant B. Patel
(74) *Attorney, Agent, or Firm*—Westman, Champlin & Kelly, P.A.

(57) ABSTRACT

A method and system for managing power in a device having a power source is described. The method and system includes a switch and at least one controller. The switch is coupled with the power source and a portion of the device. The at least one controller is coupled with the switch and is for controlling the switch to be open or closed based on instructions provided to the controller. The controller toggles the switch to provide pulse-width modulation, thereby stepping-down a first power to a desired power provided to the portion of the device. In another aspect, the method and system include loading software for providing pulse width modulation in at least one controller of a system. The system includes at least one switch coupled with the power source, a portion of the device and the controller. In this aspect, the method and system also include utilizing the at least one controller for toggling the switch to provide pulse-width modulation based on the software. Thus, a first power is stepped down to a desired power provided to the portion of the device.

21 Claims, 9 Drawing Sheets

SYSTEM AND METHOD FOR PROVIDING STEP-DOWN POWER CONVERSION USING AN INTELLIGENT SWITCH

This Application claims benefit of provisional Application Ser. No. 60/153,372 filed Sep. 10, 1999.

FIELD OF THE INVENTION

The present invention relates to systems which may have a limited power supply and more particularly to a method and system for providing intelligent power management that allows for step-down power conversion in such a system.

BACKGROUND OF THE INVENTION

Many systems utilize a power supply which may have a limited capacity. For example, truck tractors, boats, golf carts, and satellites may utilize a battery or other energy storage apparatus for DC electrical power. These devices may have a mechanism for recharging the battery, such as an alternator. However, on occasion these devices operate on the stored power from the battery. For example, a truck tractor typically includes an alternator for generating power, a battery for storing power, and various subsystems which may consume power. These power consumers include a cranking system; lights; computers; communication devices electronics for the engine, brakes, steering and other subsystems; and comfort devices such as heating cooling, ventilation, refrigeration, microwaves, and televisions. Many of the power consumers can operate on the stored power of the battery alone when the alternator is not generating power.

Breakdown of the electrical system can be the primary cause of failure for many of these devices, such as the tractor trailer. Even where the electrical system is less subject to malfunctions, breakdown of the electrical system can cause the device to be unable to function. Such a failure of the device may be expensive, both to repair and in other costs absorbed by the user. For example, a failure of the electrical system which drains the battery of a truck tractor may be costly not only because the truck tractor must be towed to another location and repaired, but also because time and perishable cargo may be lost. Consequently, the ability to predict, diagnose, and avoid such failures is desirable.

Mechanisms for avoiding such failure are disclosed in U.S. Pat. No. 5,871,858 by Thomsen et al. ("Thomsen") and U.S. Pat. No. 5,798,577 by Lesesky et al. ("Lesesky"). Thomsen and Lesesky treat one problem that has been diagnosed in devices such as a truck tractor, the problem of overcranking. Consequently, Thomsen discloses cutting off power to the cranking system of a truck tractor when the current flowing and time for which the current flows exceed a particular level. Similarly, Lesesky discloses cutting off power to the cranking system of a truck tractor when a user has provided a cranking signal for greater than a particular time. Furthermore, Thomsen treats the problem of theft using solid state switches controlled using a micro-computer and a code input by a user. Based on whether a code is provided to the system, whether the internal temperature of a switch is above a particular value, and whether a particular current has been provided for a particular time, Thomsen allows power to be provided to the cranking motor.

However, it would still be desirable to be capable of diagnosing impending failures, avoiding failures, providing power to consumers in a more optimal manner. Accordingly, what is needed is a system and method for providing intelligent power management. The present invention addresses such a need.

SUMMARY OF THE INVENTION

A method and system for managing power in a device having a power source is described. The method and system comprise switches and at least one controller. The switch is coupled with the power source and a portion of the device. The at least one controller is coupled with the switch and is for controlling the switch to be open or closed based on instructions provided to the controller. The controller toggles the switch to provide pulse-width modulation, thereby stepping-down a first power to a desired power provided to the portion of the device. In another aspect, the method and system comprise loading software for providing pulse width modulation in at least one controller of a system. The system includes at least one switch coupled with the power source, a portion of the device and the controller. In this aspect, the method and system also comprise utilizing the at least one controller for toggling the switch to provide pulse-width modulation based on the software. Thus, a first power is stepped down to a desired power provided to the portion of the device.

According to the system and method disclosed herein, the present invention allows power to different subsystems to be stepped down. As a result, the desired power can be provided to particular subsystems, improving the operation of subsystems of the device, such as the battery.

DETAILED DESCRIPTION OF THE INVENTION

The present invention relates to an improvement in power management technology, particularly for DC electrical power sources which may have limited capacity. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A method and system for managing power in a device having a power source is described. The method and system comprise providing a switch and at least one controller. The switch is coupled with the power source and a portion of the device. The at least one controller is coupled with the switch and is for controlling the switch to be open or closed based on instructions provided to the controller. The controller toggles the switch to provide pulse-width modulation, thereby stepping-down a first power to a desired power provided to the portion of the device. In another aspect, the method and system comprise loading software for providing pulse width modulation in at least one controller of a system. The system includes at least one switch coupled with the power source, a portion of the device and the controller. In this aspect, the method and system also comprise utilizing the at least one controller for toggling the switch to provide pulse-width modulation based on the software. Thus, a first power is stepped down to a desired power provided to the portion of the device.

The present invention will be described in terms of a particular configuration and particular devices. However, one of ordinary skill in the art will readily recognize that this method and system will operate effectively for other configurations, including other connections with power sources and power consumers. Furthermore, one of ordinary skill in the art will readily recognize that the present invention can be used in a variety of other devices, such as satellites, boats, or other devices.

Figure 1A:
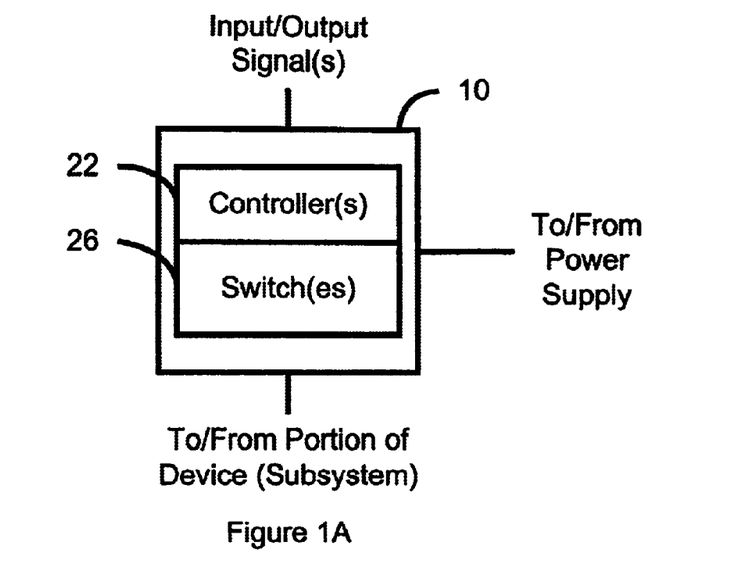
FIG. 1A is a high-level block diagram of one embodiment of an intelligent power management system in accordance with the present invention.

To more particularly illustrate the method and system in accordance with the present invention, refer now to 1A, which depicts a high-level block diagram of one embodiment of an intelligent power management system, or power management module ("PMM") 10 in accordance with the present invention. The PMM 10 depicted is essentially an intelligent switch which can be considered to include at least a controller 22 and switches 26. The controller 22 and switches 26 are preferably integrated together in a single module. The switches 26 are preferably solid state devices such as MOSFET switches. The controller 22 is preferably a programmable microcomputer. Thus, the controller 22 may be individually tailored for functions desired by a user of the PMM 10. The controller 22 can receive input signals in order to aid in controlling the switches 26. For example, the controller 22 can receive signals from a device with which the PMM 10 is being used or from internal sensors which may be coupled to one or more of the switches 26. The switches 26 are coupled with a power supply and a portion of the device, such as a subsystem. Thus, depending upon whether a particular switch 26 is closed, power may be provided to a subsystem of the device. Using the intelligence in the controller 22 and the switches 26, the PMM 10 can control the switching of power to portions of the device in which the PMM 10 is used. Thus, the PMM 10 can act as an intelligent switch. As a result, power management in the device can be improved.

Figure 1B:
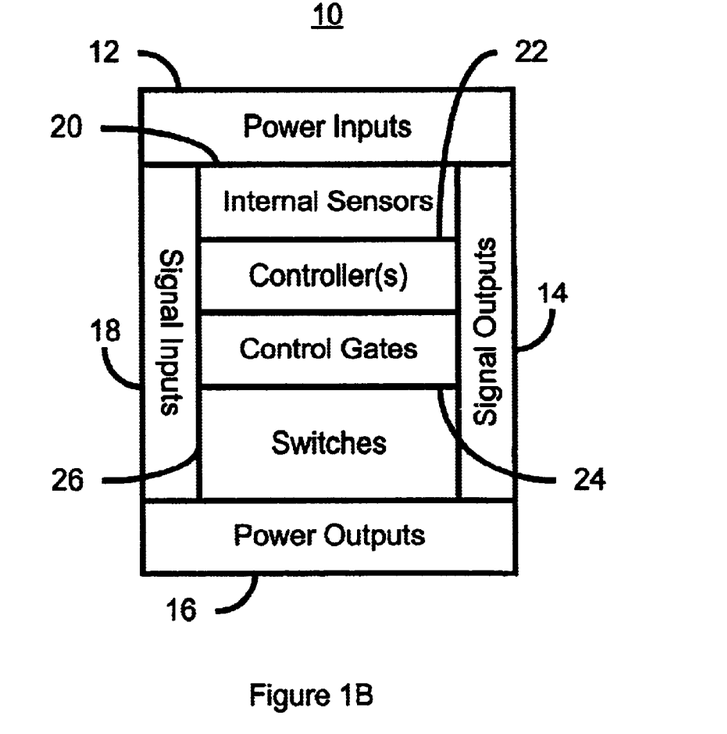
FIG. 1B is a block diagram of one embodiment of an intelligent power management system in accordance with the present invention.

FIG. 1B depicts a more detailed diagram of one embodiment of an intelligent power management system, or PMM 10, in accordance with the present invention. The PMM 10 includes power inputs 12, power output 16, signal inputs 18, signal outputs 14, internal sensors 20, a controller 22, switches 26 and, preferably, control gates 24 for the switches 26. The switches 26 are preferably devices such as MOSFET switches. The controller 22 is preferably a programmable microcomputer. Thus, the controller 22 may be individually tailored for functions desired by a user of the PMM 10. The controller 22 can communicate with portions of the device in which the PMM 10 is used via the signal input 18 and signal output 14. Thus, the controller can receive signals from a device with which the PMM 10 is being used through the signal input 18. Furthermore, the controller 22 can provide data and commands to the device through the signal output 14. The internal sensors 20 monitor the condition of the PMM 10. For example, the internal sensors 20 could include temperature sensors for various portions of the PMM 10, such as the switches 26, as well as current and voltage sensors for the switches 26. The internal sensors 20 may also include a timer, or clock, (not explicitly shown in FIG. 1B). In a preferred embodiment, the internal sensors 20 include temperature, voltage, and current sensors for each of the switches 26.

Figure 1C:
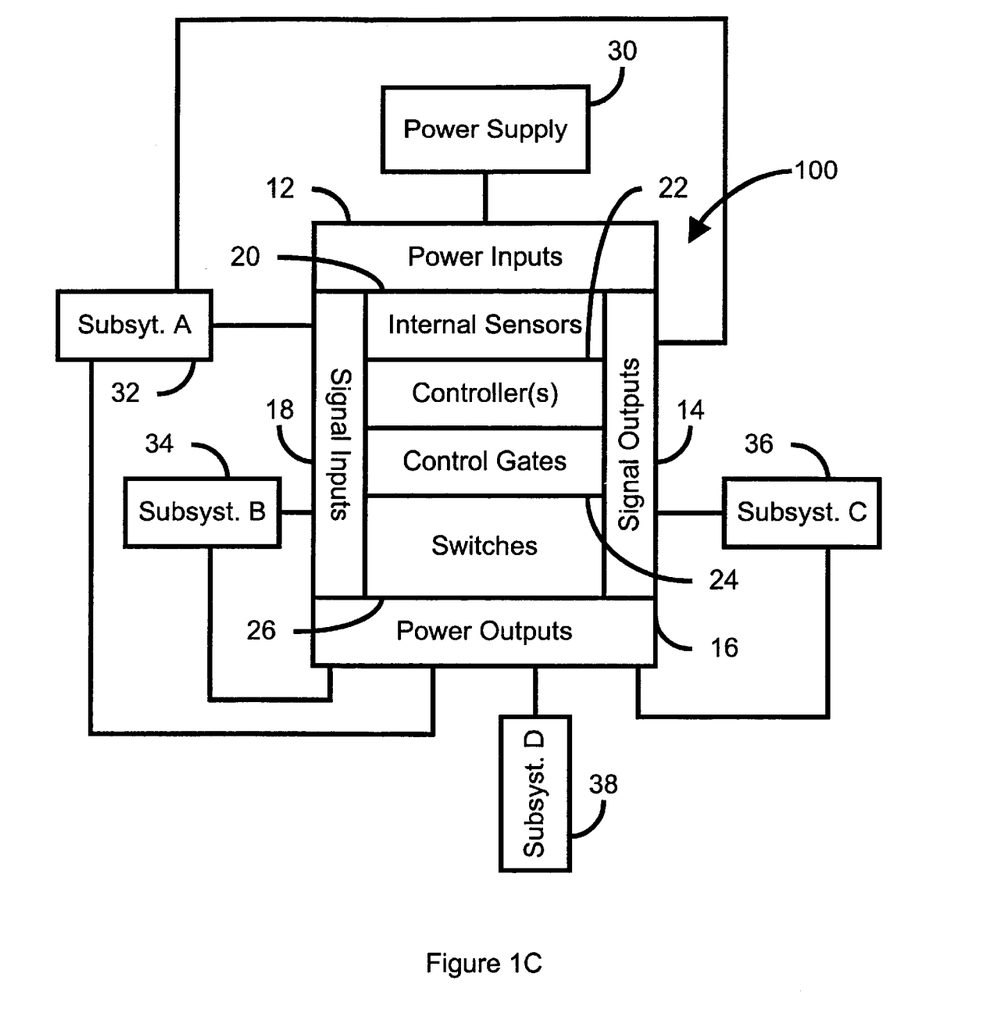
FIG. 1C is a block diagram of one embodiment of the intelligent power management system as coupled with a device.

FIG. 1C depicts an embodiment of the PMM 100 coupled with subsystems of a device. The PMM 100 is preferably the same as the PMM 10, though components are numbered differently. The PMM 100 still includes the signal input 18, the signal output 14, the power input 12, the power output 16, the internal sensors 20, the controller 22 and switches 26. Not depicted are the control gates 24 which may be provided. The PMM 100 is coupled to a power supply 30 through the power input 12. The power supply 30 includes at least one or more power storage devices (not explicitly shown), such as a battery, and may also include power generating devices (not explicitly shown), such as one or more alternators. In a preferred embodiment, the PMM 100 is separately coupled to the alternator and battery. The PMM 100 receives signals from subsystem A 32 and subsystem B 34 through the signal input 18. The PMM 100 provides signals to subsystem A 32 and a subsystem C 36 using the signal output 14. The PMM 100 is also coupled to subsystem A 32, subsystem B 34, subsystem C 36 and subsystem D 38. The PMM 100 is capable of a variety of functions, including but not limited to one or more of the following: managing the generation and storage of power, monitoring and controlling power consumption, cutting off power to one or more consumers based on a variety of programmable factors, providing step down power conversion of the power supplied by the power source 30, providing protection against spikes, providing protection against shorts, providing reverse polarity protection, providing a self learning capability, learning the signatures of one or more subsystems, diagnosing potential failures based on the signatures of one or more subsystems, protecting against potential failures based on the signatures of one or more subsystems, and protecting against drainage of the power source 30.

Figure 1D:
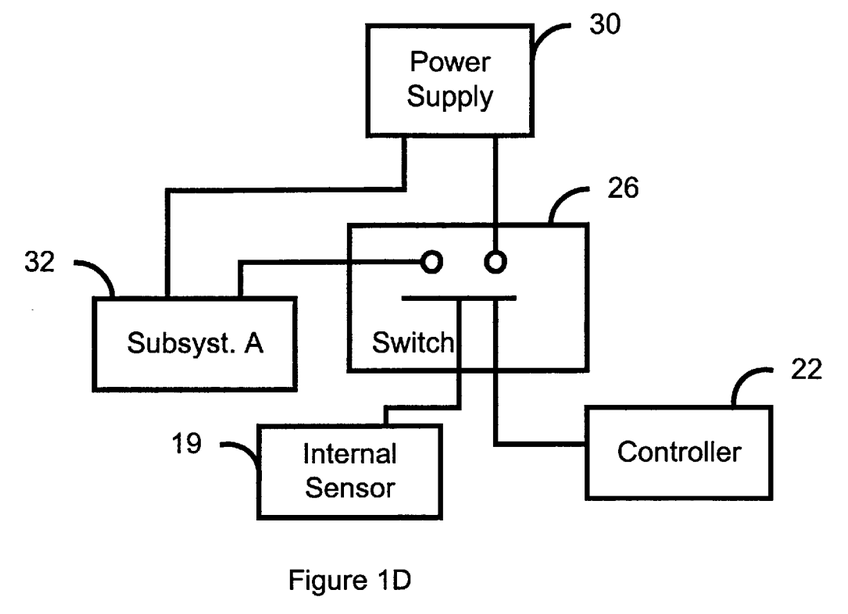
FIG. 1D is a block diagram of one embodiment of the intelligent power management system as coupled with a device.

FIG. 1D depicts one embodiment of a portion of the PMM 10 or 100 and the device to which the PMM 10 is coupled. The switch 26, which is one of the switches of the PMM 10, is connected between the power supply 30 of the device and the subsystem A 32 of the device. Consequently, when the switch 26 is open, as depicted in FIG. 1D, no power is provided to the subsystem A 32. However, when the switch 26 is closed, power is provided to the subsystem A 32. Also depicted are the controller 22 and internal sensor 19 coupled with the switch 26. Other or different components internal to the PMM 10 or 100 can be coupled with the switch 26. For example, in a preferred embodiment, current, voltage and temperature through the switch 26 are also monitored. The internal sensor 19 provides to the controller 22 an electrical signal indicating a property of one or more of the. switches 26. Using the signal from the internal sensor 19 and/or other signals input to the controller 22 and based on the instructions provided to the controller 22, the controller 22 can control the switch to be open or closed.

Figure 1E:
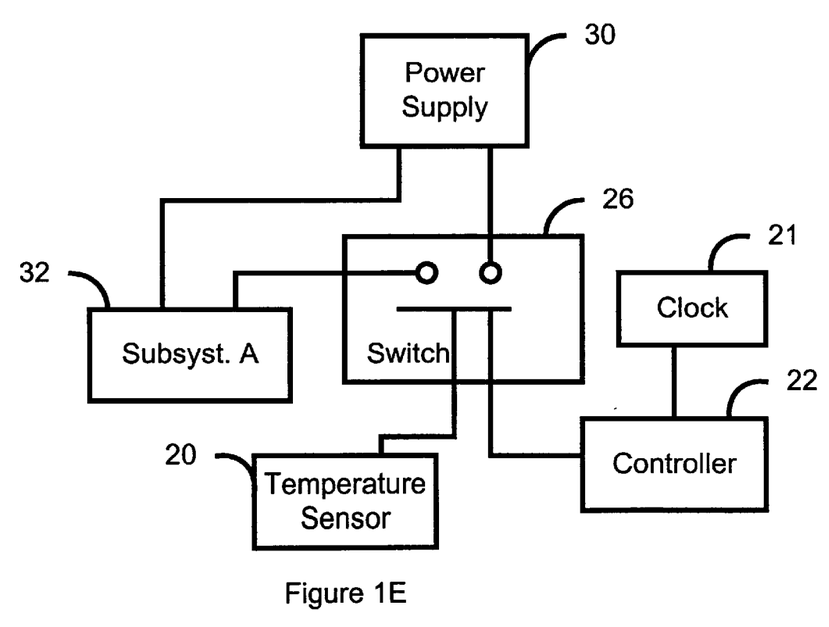
FIG. 1E is a block diagram of one embodiment of how a switch of the intelligent power management system is coupled with a portion of a device.

FIG. 1E depicts one embodiment of a portion of the PMM 10 or 100 and the device to which the PMM 10 or 100 is coupled. The switch 26, which is one of the switches of the PMM 10, is connected between the power supply 30 of the device and the subsystem A 32 of the device. Consequently, when the switch 26 is open, as depicted in FIG. 1E, no power is provided to the subsystem A 32. However, when the switch 26 is closed, power is provided to the subsystem A 32. Also depicted are the controller 22, temperature sensor 20 and clock 21 coupled with the switch 26. Other or different components internal to the PMM 10 or 100 can be coupled with the switch 26. For example, in a preferred embodiment, current and voltage through the switch 26 are also monitored. The temperature sensor 20 is thermally coupled with the switch 26 and coupled with the controller 22. Preferably, the temperature sensor 20 provides to the controller 22 an electrical signal indicating the temperature of the switch 26. The clock 21 is coupled to the controller 22 and can provide an indication of how long the switch 26 has been open or closed.

Figure 1F:
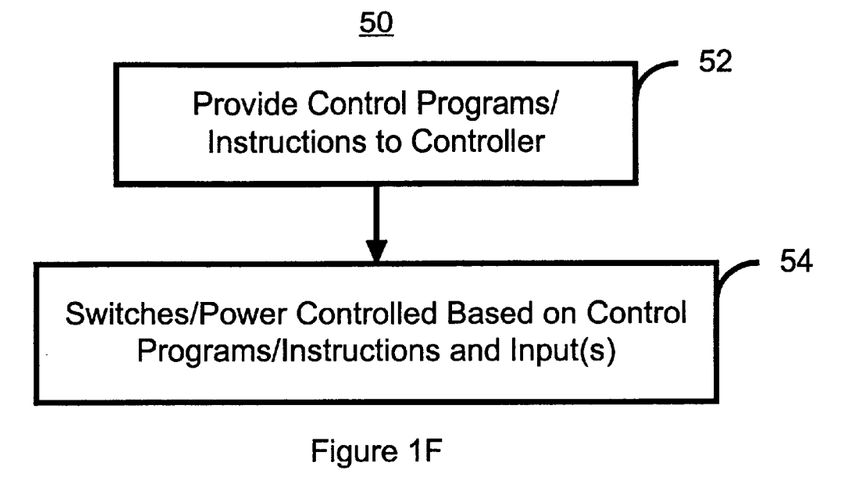
FIG. 1F is a high level flow chart of the functions of the power management module in accordance with the present invention.

FIG. 1F depicts a high-level flow chart of one embodiment of a method 50 for using the PMM 10 or 100 in accordance with the present invention. One or more control programs are provided to the controller 22, via step 52. The controller 22 then controls the power supplied to different power consumers based on the program and other inputs to the PMM 10 or 100, via step 54. Thus, the controller 22 opens or closes the switches 26 under certain conditions. The data provided by the internal sensors 20, an internal clock or information provided by the subsystems of the device that are connected to the signal input 18 inform the controller 22 as to the condition of the PMM 10 or 100 and the device to which the PMM 10 or 100 is connected. The PMM 10 or 100 can use this data with the instructions provided in the controller in order to determine when to open or close the switches 26. For example, the PMM 10 or 100 can determine whether the data meet certain criteria and operate the switches 26 accordingly.

To further illustrate the structure, functions, and capabilities of the present invention, reference will be made to the use of a PMM in the context of a particular device, a truck tractor. However, one of ordinary skill in the art will readily realize that analogous or functions may be provided by a PMM in other devices.

Figure 2A:
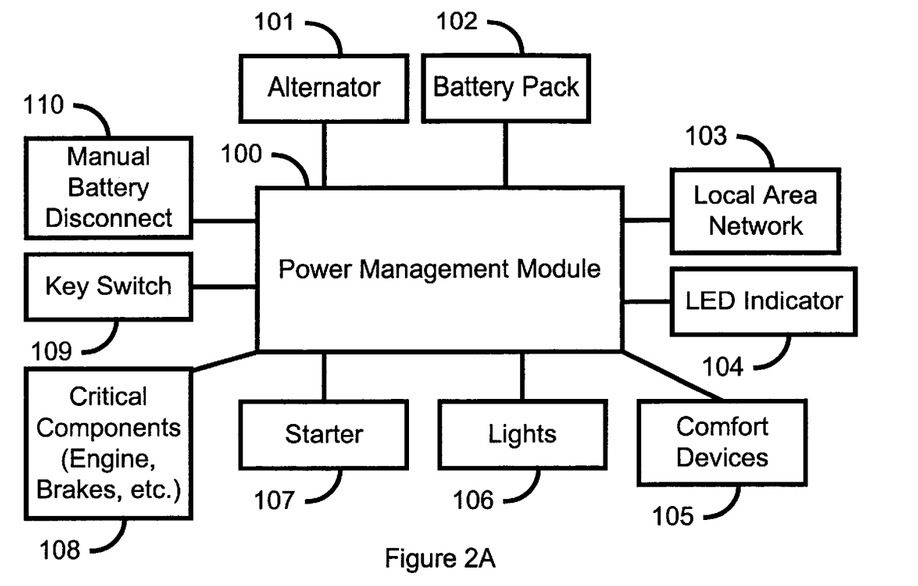
FIG. 2A is a high-level block diagram of one embodiment of a power management module in accordance with the present invention is used in a truck tractor.

FIG. 2A depicts a PMM 100 as it is coupled with subsystems in a truck tractor. Although numbered differently, components of the PMM 100 shown in FIG. 2A correspond to similarly named components in the PMM 10 shown in FIGS. 1A–E. Referring back to FIG. 2A, The truck tractor includes two power supplies, an alternator 101 which generates power and a battery pack 102 which stores power. The truck tractor also includes various subsystems such as a local area network 103, and LED indicator 104, comfort devices 105, lights 106, a starter 107, critical components 108, a start key switch 109 and a manual battery disconnect switch 110. The comfort devices 105 may include components such as a radio, refrigerator, or other devices. The critical components 108 include the engine, brakes, and other components.

Figure 2B:
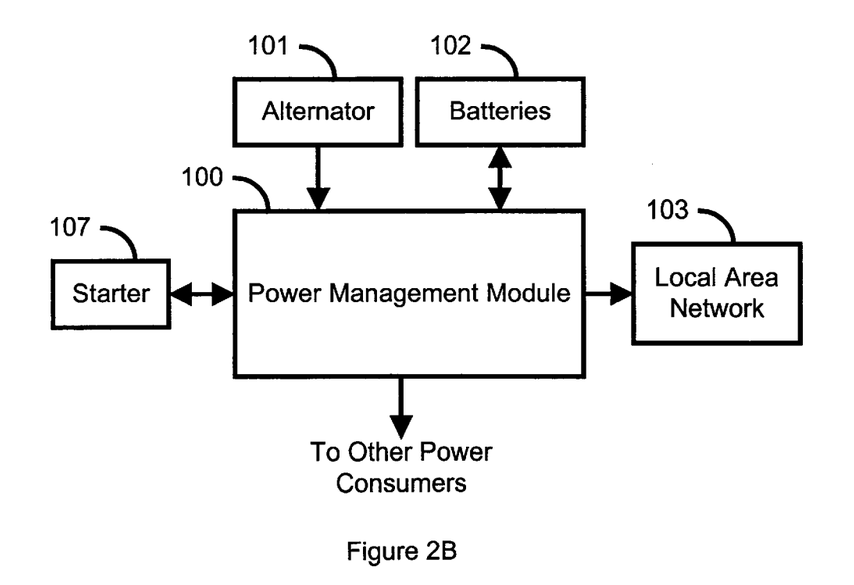
FIG. 2B is another high-level block diagram of one embodiment of a power to management module in accordance with the present invention is used in a truck tractor.

FIG. 2B is another high-level diagram of the PMM 100 as coupled with certain subsystems in a device such as a truck tractor. The PMM 100 is depicted as being coupled to the batteries 102 and the alternator 101, the starter 107, other power consumers, and the LAN 103. Based on communication with the batteries 102, alternator 101, and various subsystems of the truck tractor, the PMM 100 can control switches (not explicitly shown in FIG. 2B) within the PMM 100 and can communicate with portions of the truck tractor so that a variety of functions are performed. These functions include but are not limited to those disclosed in the present application. As depicted in FIG. 2B, the PMM 100 may recognize differing power requirements for the batteries 102 under different conditions and determine the power drawn by the subsystems of the truck tractor. For example, the PMM 100 may recognize the ideal charge for the batteries 102 over a range of battery temperatures, battery capacity, and various requirements of the starter, such as voltage and current. The PMM 100 may also communicate with the batteries 102 to determine the remaining life in the batteries 102. Consequently, the PMM 100 may control other portions of the truck tractor and the power provided to the batteries 102 to meet the requirements of the batteries 102. Thus, the PMM 100 may ensure that the batteries 102 are charged close to the ideal level and may regulate power to power consumers to extend the life of the batteries 102 or ensure that the batteries 102 have sufficient power for critical applications. Consequently, the PMM 100 may identify and prevent potential failure of the batteries 102. The PMM 100 also receives signals from and provides signals to the alternator 101. Thus, potential failures of the alternator 101 or harm due to problems within the alternator 101 or other portions of the truck tractor may be prevented. The output of the alternator 101 may also be controlled based on signals provided from the PMM 100, for example to optimize battery power. In addition, switches between the alternator 101 and other portions of the truck tractor, including the batteries 102, may be provided. The PMM 100 may control these switches to provide the desired power to other portions of the truck tractor. Furthermore, the PMM 100 communicates with the starter (cranking) subsystem 107, identifying impending failure and preventing harm to the starter 107 due to system failure or user abuse. The power to the starter 107 may also be controlled based on other factors, such as the power remaining in the batteries 102 or the temperature of switches in the PMM 100. The PMM 100 also communicates with the LAN 103 for the truck tractor and other power consumes. Information relating to the status of the truck tractor may be communicated between the LAN 103 and the PMM 100. In addition to communicating with various other subsystems, the PMM 100 may control each subsystem's power consumption. For example, the PMM 100 may cut off power to the subsystems or reduce power to the subsystem. The PMM 100 may also control power to the subsystems to ensure that power in the batteries 102 or alternator 101 exists for critical needs and to ensure that the subsystems receive the appropriate amount of power. The PMM 100 may also monitor the subsystems to prevent harm from short circuits, spikes, or failures. The PMM 100 can also control and regulate power output to power sensitive devices, such as light bulbs.

Figure 3:
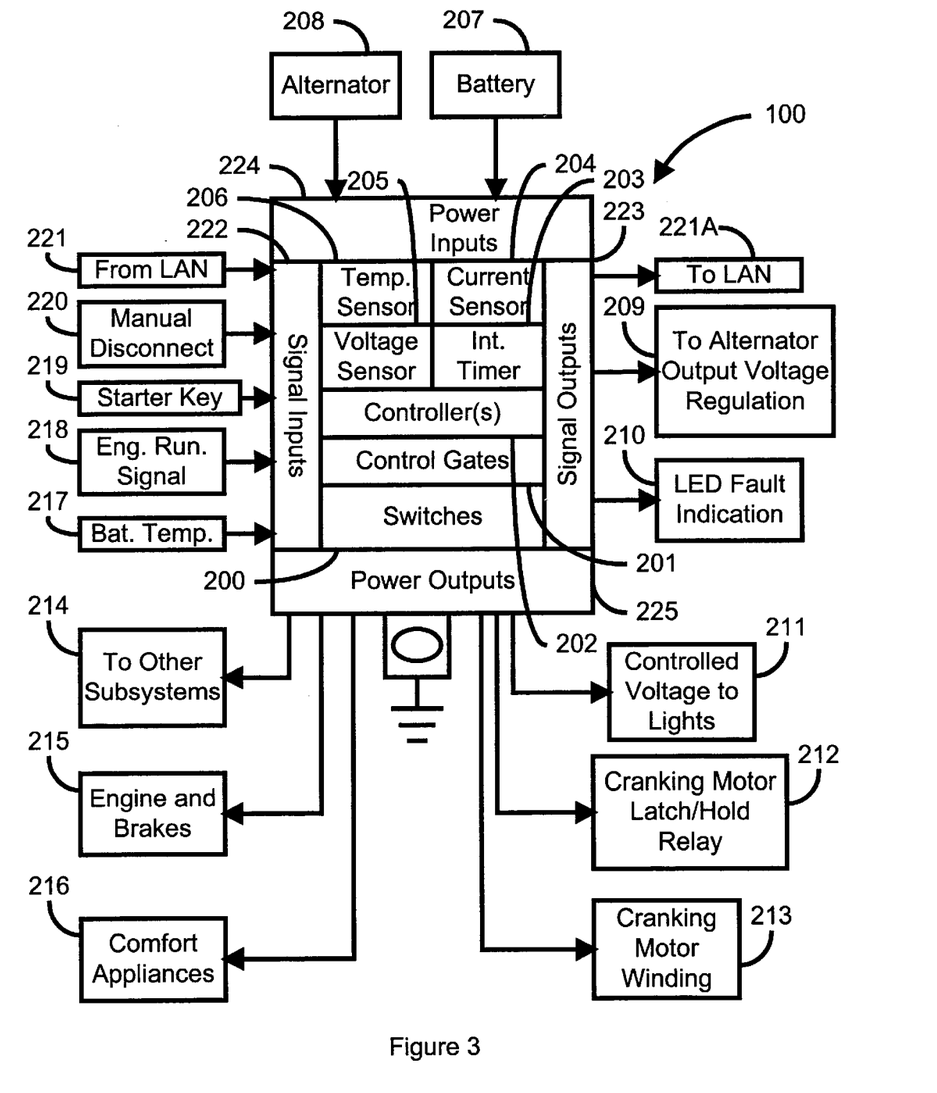
FIG. 3 is a more detailed block diagram of one embodiment of a power management module in accordance with the present invention is used in a truck tractor.

FIG. 3 more particularly illustrates the connections between the PMM 100 and subsystems of the truck tractor. Although numbered differently, components of the PMM 100 shown in FIG. 3 correspond to similarly named components in the PMM 100 shown in FIG. 2A. Referring back to FIG. 3, the PMM 100 includes signal inputs 222, signal outputs 223, power inputs 224 and power outputs 225. The PMM 100 also includes MOSFET switches 200, control gates 201 and a controller 202. The control gates 201 control the switches 200. The controller 202 controls the control gates 201 and, therefore, controls the switches 200. The controller 202 is preferably a programmable microcomputer. The PMM 100 also includes an internal timer 203, current sensors 204, voltage sensors 205 and temperature sensors 206. The current sensors 204, voltage sensor 205, and temperature sensors 206 monitor the current through, voltage across and temperature of, respectively, the switches 200. Preferably each of the switches 200 includes a current sensor 204, a voltage sensor 205, and a temperature sensor 206. In addition, the PMM 100 includes components for monitoring various portions of the truck tractor. For example, the PMM 100 may monitor the voltage across and current through certain power consumers and may monitor the charge level, rate of charge and rate of discharge of the battery 207.

The PMM 100 is coupled to two power supplies, battery 207 and the alternator 208. The PMM 100 receives signals from a local area network (LAN) line 221, a manual disconnect line 220, a starter key line 219, an engine running signal line 218, and a battery temperature sensor line 217 provided from a LAN (not shown), a manual disconnect switch (not shown), a starter key (not shown), an sensor indicating whether the engine is running (not shown) and a battery temperature sensor (not shown), respectively. The PMM 100 provides signals to a LAN, the alternator 208, and an LED via a communication to LAN line 221 A, a input to alternator output voltage regulation line 209, and an LED fault indication line 210, respectively. Consequently, the PMM 100 can receive data from, provide data to, and provide commands to different subsystems of the truck tractor. For example, the manual disconnect line 220 indicates whether the battery 207 and alternator 208 should be cut off by the PMM 100. The starter key line 219 indicates whether a user has turned a starter key to start up the engine of the truck tractor. The engine running signal line 218 indicates to the PMM 100 whether the engine is already running, allowing the PMM 100 to prevent power from flowing to the cranking subsystem when the engine is already on. The PMM 100 can monitor the temperature of the battery via line 217, and can monitor the voltage across the battery 207, for example to control charging of the battery 207. Furthermore, the PMM 100 can control output of the alternator 208 through the input to alternator output voltage regulation line 209. The PMM 100 can also indicate to the user if a fault has occurred via LED fault indication line 210. The temperature sensors 206 provide an indication of the temperature of the switches 200. This allows the controller to open one or more of the switches when their temperature is too high.

A typical alternator, such as the alternator 208, is three-phase alternating current generator. The rectifier circuit (not shown) in the alternator 208 converts alternating current (AC) to direct current (DC). Important components in the rectifier are diodes. When a diode or other component fails in one phase of the alternator 208, the alternator 208 will generate only two-thirds of the power. This will put significant stress on the two working phases of the alternator 208. This leads to quick and progressive failure of all phases of the alternator 208. Currently, conventional devices in the market place cannot detect the loss of a phase and prevent the rapid and eminent failure of the other phases. The PMM 100 can detect the loss of a phase through alternator signature recognition. In response, the PMM 100 can reduce the demand on the alternator 208. This will give time to fix the alternator at the next scheduled maintenance rather failing unexpectedly on a high way where the maintenance and downtime costs are excessive.

The alternator 208 has both stator and rotor windings. Any one of these windings can develop electrical short or open condition. When shorted or open condition develops, the alternator 208 will generate reduced electrical power. This will put significant stress on windings that are normal. Progressive failure of other components rapidly follows. Currently no conventional devices detect a short or open condition to prevent the failure of other components. The PMM 100 can detect the loss of a phase through alternator signature recognition, and reduces the demand on alternator 208. This will give time to fix the alternator 208 at the next scheduled maintenance rather failing unexpectedly, resulting in excessive maintenance and downtime costs.

Furthermore the PMM can detect and account for the failure of the belt and pulley system driving the alternator. When the belt or pulley slips, the alternator cannot generate power that it is designed to generate. The slip condition heats up the belt, pulley, alternator bearings and other portions of the truck tractor. The PMM 100 can detect the existence of these conditions, using communication with the truck tractor and monitoring the difference between the behavior of the alternator and its signature. PMM can then take appropriate action, for example by providing an alarm to the user.

The PMM 100 can also monitor the power consumers and supplies. Thus, the PMM 100 is coupled with several subsystems that act as power consumers. For example, the PMM 100 is coupled with the lights, a cranking motor latch/hold coil, a cranking motor winding, other devices in the truck tractor, the engine and brakes, and comfort appliances via the lights line 211, a cranking motor latch/hold coil line 212, a cranking motor winding line 213, other devices in the truck tractor line 214, engine and brakes line 215, and comfort appliances line 216. Thus, in the embodiment shown in FIG. 3, the PMM 100 is coupled to the cranking subsystem through two lines 212 and 213. Using the lines 211, 212, 213, 214, 215, and 216, the PMM 100 can monitor and control power to various subsystems of the truck tractor, such as the lights, components of the cranking subsystem, the engine and brakes, comfort appliances, and other subsystems. For example, the PMM 100 can provide pulse width modulation (PWM) to control the magnitude of the power supplied to a particular subsystem. Thus, the voltage applied to the lights, the engine, and the brakes can be decreased as desired to extend the life of or better control components. The PMM 100 can also monitor and regulate the demand on the alternator, preferably by using PWM. For example, when the engine is started when the whether is cold, the battery charge is low and the power use is high, the electrical system will try to draw as much current as possible from the alternator 208 instantaneously. This condition puts high stress on and reduces the life of the alternator 208. The PMM 100 monitors and regulates the demand on the alternator 208 such that the stress on alternator is moderated and maintained at an optimum level. This is accomplished through PWM of alternator output.

The PMM 100 is also capable of keeping track of these information for various components such as starter (cranking subsystem), battery 207, alternator 208, light bulbs and others subsystems. Knowing the cycles and severity of operation is the accurate way of knowing the actual usage of these components. By knowing this, most optimum maintenance schedule can be used. This will avoid servicing or changing components before its time. This will also help to avoid not serving or changing components when it is time.

Figure 4A:
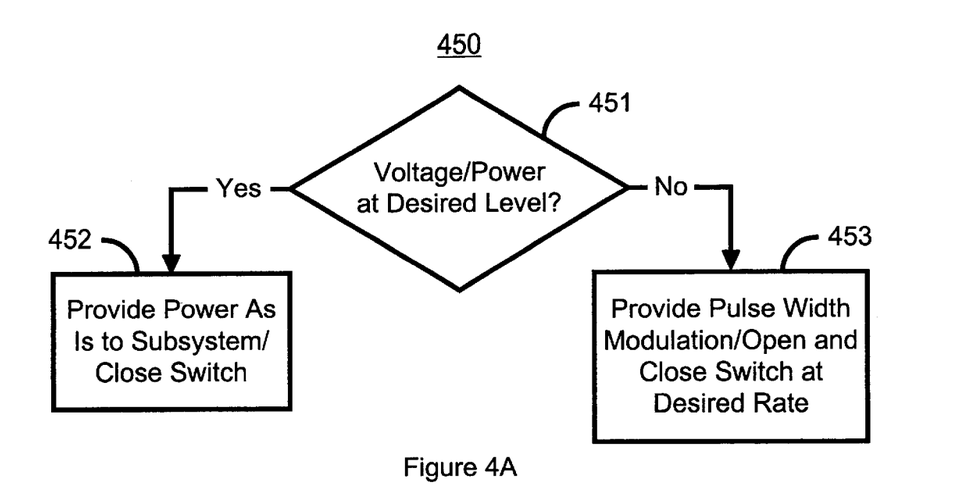
FIG. 4A is a flow chart depicting one embodiment of a method for stepping down the power using the power management module in accordance with the present invention.

FIG. 4A depicts one embodiment of a method 450 for stepping down the power provided by a voltage source using the PMM 10 or 100. The method 450 can be used with any PMM 10 or 100 which steps down the voltage provided by a power supply. For example, the PMMs 10 and 100 depicted in FIGS. 1A–B, 2A and 3 may utilize the method 450 for providing PWM. PWM may also be provided in other instances, such as stepping down the voltage of a power supply for providing power to lights or other systems in a device such as a truck tractor. PWM can also be used to regulate the power from the alternator or other power generator, for example to the battery as described below. In such a case, the switch which is toggled may be coupled between the alternator and the other portions of the device. PWM helps prevent the device from drawing too much power from the alternator during starting and other events. PWM can also help prevent spikes. For example, when a component like the cranking subsystem of a truck tractor is started, the current drawn rises to a high spike is unregulated. The peak current could be four times the average current. This high current rush puts stress on the electrical system. The PMM 10 or 100 can limit the peak rush-in current by turning on and off the switches, in a manner similar to PWM. Thus, current spikes are reduced in magnitude.

The method 450 preferably commences after program instructions are provided to the PMM 10 or 100 using the method 50 depicted in FIG. 1E. Referring to FIGS. 4A and 2A, the controller for the PMM 100 determines whether the voltage provided by the power supply for a particular subsystem is at the desired level, via step 451. Step 451 may be performed by comparing the voltage provided to the subsystem to a particular level at a particular time or by determining that the voltage is to be stepped down at a particular time. The particular voltage or the determination that the voltage is to be stepped down may be made based on the information and instruction provided for the program entered in step 52 of the method 50 depicted in FIG. 1F. Referring back to FIGS. 4A and 2A, if the voltage is at the desired level, then the switch for the subsystem is closed, via step 452. If the voltage is not at the desired level, then the controller provides pulse with modulation by commanding the appropriate switch to open and close at the rate desired for the stepped down voltage, via step 453. In one embodiment, the rate at which the switch should be opened and closed is previously known. In such an embodiment, step 453 can include simply opening and closing the switch at the known rate.

Figure 4B:
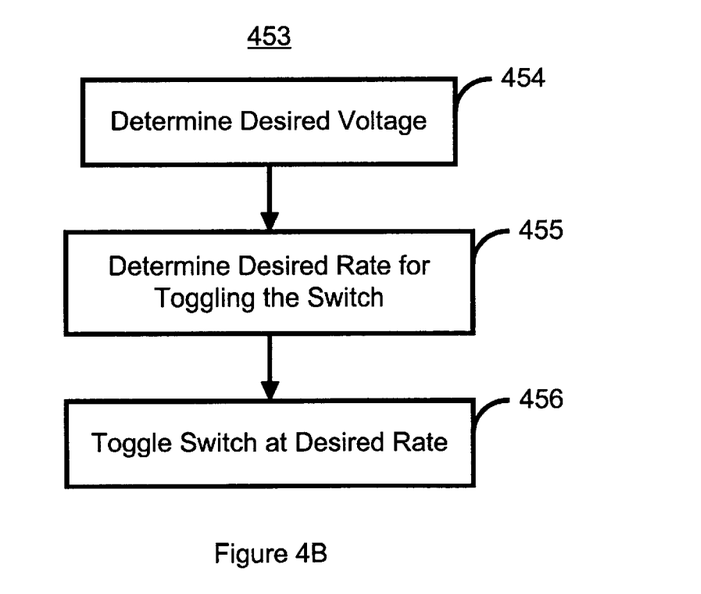
FIG. 4B is a flow chart depicting another embodiment of a method for stepping down the power using the power management module in accordance with the present invention.

FIG. 4B depicts one embodiment of the step 453, providing PWM for the desired voltage. The desired voltage is determined, via step 454. The desired rate at which the switch should be opened and closed based on the current voltage and the desired voltage is determined, via step 455. The switch is then opened and closed at the desired rate, via step 456.

Figure 5A:
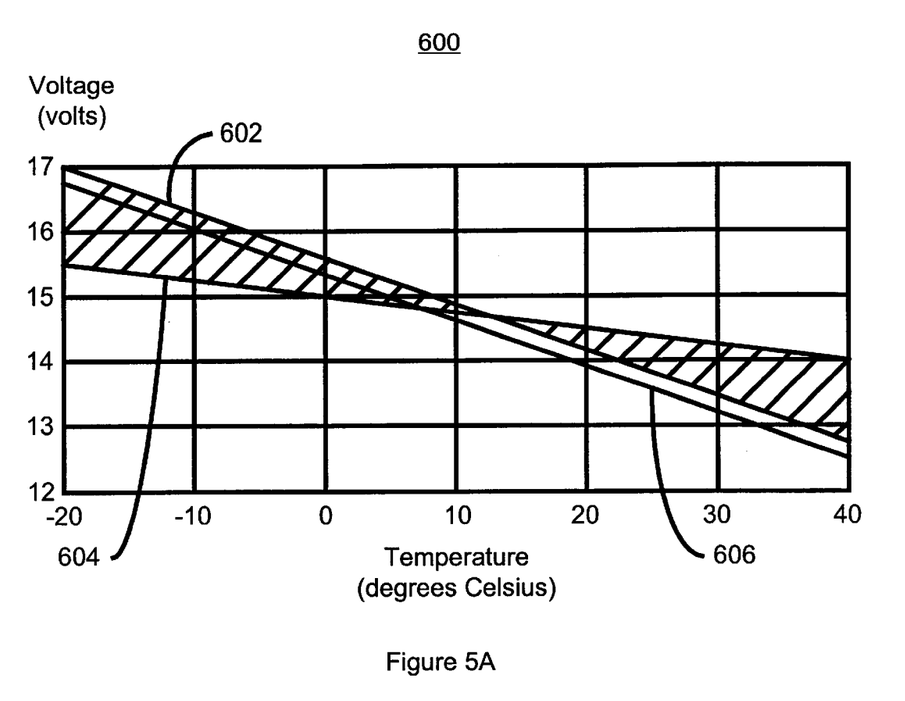
FIG. 5A is a graph depicting how a battery is conventionally charged and how the power management module in accordance with the present invention can charge the battery.

The PMM 100 can also control the power of the truck tractor so that the condition of the battery is more optimized. In order to do so, the PMM 100 may control charging of the battery, send out alarms or otherwise monitor and control the power supply and subsystems of the truck tractor. The PMM 100 may also use PWM in order to control charging of the battery. FIG. 5A is a graph 600 depicting how a battery is conventionally charged and how the power management module in accordance with the present invention can charge the battery. Lines 602 and 604 depict the range in which conventional systems charge a battery versus temperature. The line 606 depicts the desired, or ideal, charge for a battery versus temperature. Typically, conventional systems charge the battery using any portion of the output of the alternator which is not being consumed by subsystems of the truck tractor. Thus, the outputs of the alternator and power input to the battery are not controlled. As a result, conventional systems undercharge or overcharge the battery. However, the PMM 100 in accordance with the present invention can control the truck tractor such that the battery is charged at or near the ideal at a wide range of temperatures.

Figure 5B:
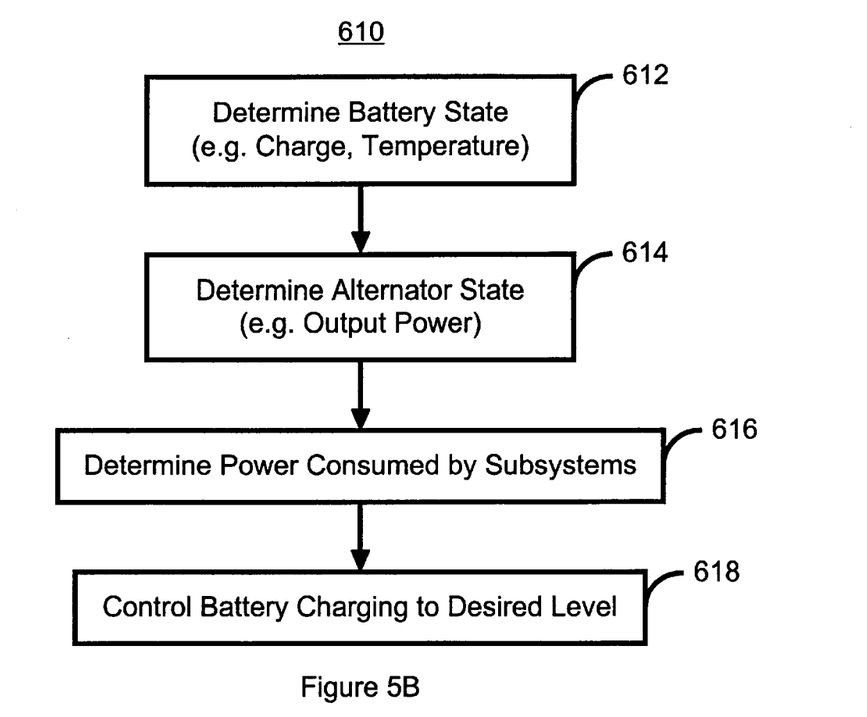
FIG. 5B is a high level flow chart of one embodiment of a method for controlling the charging of the battery using the power management module in accordance with the. present invention.

FIG. 5B is a high level flow chart of one embodiment of a method 610 for controlling the charging of the battery using the PMM 10 or 100 in accordance with the present invention. The method 610 can be viewed as performing the step 54 of the method 50 depicted in FIG. 1F. In other words, the method 610 controls the switch of the PMM 100 or 10 based on the program previously entered. The state of the battery is determined by the PMM 100, via step 612. In a preferred embodiment, step 612 includes determining the temperature, the current charge and the desired charge of the battery at the current temperature of the battery. However, step 612 could include determining other factors. The state of the alternator is determined by the PMM 10 or 100, via step 614. Step 614 preferably includes determining the current output of the alternator. The power being consumed, or power available to charge the battery, is then determined, via step 616. The charge of the battery is then controlled, preferably to be close to the ideal charge, via step 618. Step 618 may include controlling the output of the alternator, the power consumed by subsystems of the truck tractor or the power input to the battery. For example, the alternator could be controlled to output less power or PWM may be used to reduce the power provided to the battery. In a preferred embodiment, a switch of the PMM 10 or 100 is coupled between the alternator and the battery. The PMM 10 or 100 preferably opens and closes the switch to regulate the power flowing through the battery using PWM. Consequently, the charging of the battery can be controlled. Because the charging of the battery can be controlled to be closer to ideal, the performance and lifetime of the battery may be extended.

Figure 5C:
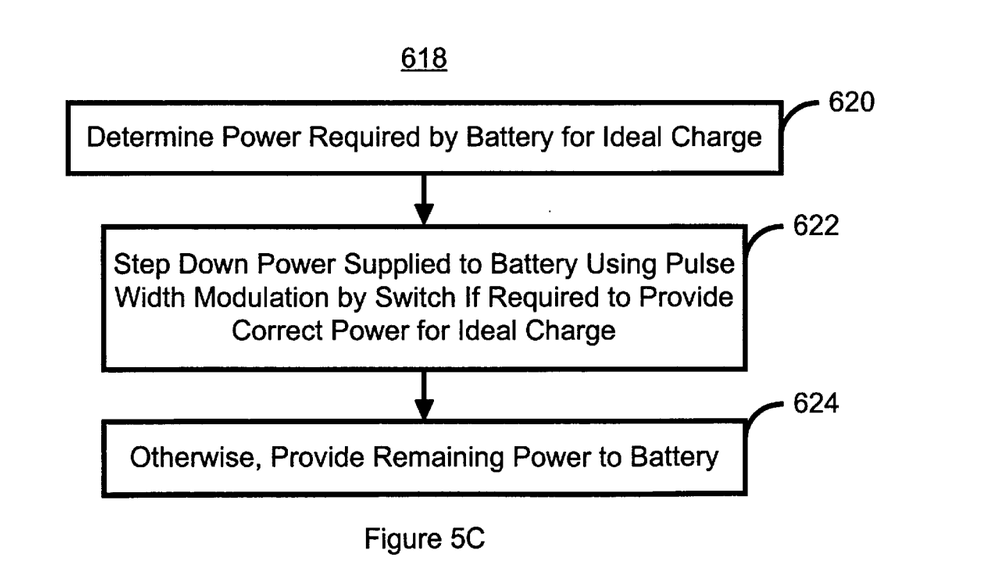
FIG. 5C is a high level flow chart of one embodiment of a method for controlling the charging of the battery to a desired level using the power management module in accordance with the present invention.

FIG. 5C is a high level flow chart of one embodiment of a method for performing step 618, controlling the charging of the battery to a desired level. The ideal power to be supplied to the battery for an ideal charge is determined, via step 620. Step 620 is preferably performed using the characteristics of the battery determined in step 612 of the method 610 depicted in FIG. 5B. Referring back to FIG. 5C, the power provided from the alternator to the battery is stepped down using PWM to provide the ideal power to the battery if the ideal power is less than the power that would otherwise be supplied to the battery, via step 622. The power that would otherwise be supplied to the battery is preferably determined using the state of the alternator determined in step 614 and the power being consumed in step 616 of the method 610 depicted in FIG. 5B. Referring back to FIG. 5C, step 622 is performed by toggling one or more switches between the alternator and the battery at a rate sufficient to step down the power provided to the battery to the ideal power. If the ideal power is not less than the power that would otherwise be provided to the battery, then that power is provided to the battery, via step 624. In a preferred embodiment, step 624 provides all remaining available power to the battery after other power consumers are provided with power. Thus, using PWM, the PMM 10 and 100 can charge a battery to at or about the ideal level.

Thus, the PMM can utilize its controller, switches, internal sensors or other components to function as an intelligent switch. Thus, the PMM can control power to the various portions of the device in which the PMM is used based on a variety of factors. In particular, the PMM 10 or 100 can provide PWM to control the power provided to various subsystems. As a result, performance of the power supply is improved, reliability of the power supply and other portions of the device are improved, and failures are reduced.

A method and system has been disclosed for an intelligent power management system. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for managing power in a device having a power source, the system comprising:

at least one switch coupled with the power source and a portion of the device;

at least one controller, coupled with the switch, for controlling the switch to be open or closed based on software provided to the controller; and at least one internal sensor coupled with the at least one switch and the at least one controller, the at least one internal sensor for determining a state of the at least one switch;

wherein the controller toggles the switch to provide pulse-width modulation, thereby stepping-down a first power to a desired power provided to the portion of the device; and wherein the controller controls the switch based on the state.

2. The system of claim 1 further comprising at least one signal input for receiving information relating to the device.

3. The system of claim 1 wherein the power source includes an alternator.

4. The system of claim 3 wherein the portion of the device includes a battery.

5. The system of claim 4 further comprising at least one signal input for receiving information relating to the battery and the alternator.

6. The system of claim 3 wherein the pulse width modulation provided by the controller reduces the first power provided by a spike to the desired power.

7. The system of claim 3 wherein the pulse width modulation provided by the alternator prevents a second power from being drawn from the alternator, the second power capable of damaging the alternator.

8. A method for managing power in a device having a power source, the system comprising the steps of:

(a) providing at least one switch coupled with the power source and a portion of the device;

(b) providing at least one controller, coupled with the switch, for controlling the switch to be open or closed based on software provided to the controller;

(c) providing at least one internal sensor coupled with the at least one switch and the at least one controller, the at least one internal sensor for determining a state of the at least one switch;

wherein the controller toggles the switch to provide pulse-width modulation, thereby stepping-down a first power to a desired power provided to the portion of the device; and wherein the controller controls the switch based on the state.

9. The method of claim 8 further comprising the step of:

(c) providing at least one signal input for receiving information relating to the device.

10. The method of claim 8 wherein the power source includes an alternator.

11. The method of claim 10 wherein the portion of the device includes a battery.

12. The method of claim 11 further comprising the step of:

(c) providing at least one signal input for receiving information relating to the battery and the alternator.

13. The method of claim 10 wherein the pulse width modulation provided by the controller reduces the first power provided by a spike to the desired power.

14. The method of claim 10 wherein the pulse width modulation provided by the alternator prevents a second power from being drawn from the alternator, the second power capable of damaging the alternator.

15. A method for managing power in a device having a power source, the system comprising the steps of:

(a) loading software for providing pulse width modulation in at least one controller of a system, the system including at least one switch coupled with the power source, a portion of the device and the controller, the system also including at least one internal sensor coupled with the at least one switch and the at least one controller, the at least one internal sensor for determining a state of the at least one switch; and (b) utilizing the at least one controller for toggling the switch to provide pulse-width modulation based on the software, thereby stepping-down a first power to a desired power provided to the portion of the device and to control the switch based on the state.

16. The system of claim 1 wherein the at least one switch, the at least one controller and the at least one internal sensor are integrated into a single module.

17. The system of claim 16 wherein the at least one internal sensor includes a temperature sensor.

18. The method of claim 8 wherein the at least one switch, the at least one controller and the at least one internal sensor are integrated into a single module.

19. The method of claim 18 wherein the at least one internal sensor includes a temperature sensor.

20. The method of claim 15 wherein the at least one switch, the at least one controller and the at least one internal sensor are integrated into a single module.

21. The method of claim 20 wherein the at least one internal sensor includes a temperature sensor.

* * * * *